(12) United States Patent
Yee et al.

(10) Patent No.: US 6,729,818 B1
(45) Date of Patent: May 4, 2004

(54) SUPPLEMENTAL CARGO RESTRAINT SYSTEM FOR OVERSIZED CARGO

(75) Inventors: Paul L. Yee, Seattle, WA (US); Oscar M. Atienza, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/341,737

(22) Filed: Jan. 14, 2003

(51) Int. Cl.[7] .................................................. B60P 7/08
(52) U.S. Cl. .............................. 410/77; 410/69; 410/80
(58) Field of Search .............................. 410/69, 72, 77, 410/78, 80

(56) References Cited

U.S. PATENT DOCUMENTS

| | | | |
|---|---|---|---|
| 1,360,412 A | * | 11/1920 | Kirchner |
| 1,470,266 A | * | 10/1923 | Kirchner |
| 1,512,030 A | * | 10/1924 | Kirchner |
| 3,210,038 A | * | 10/1965 | Bader et al. |
| 3,800,713 A | | 4/1974 | Nordstrom |
| 3,933,101 A | * | 1/1976 | Blas |
| 3,995,562 A | | 12/1976 | Nordstrom |
| 4,234,278 A | * | 11/1980 | Harshman et al. ............ 410/77 |
| 4,236,853 A | * | 12/1980 | Niggemeier et al. .......... 410/77 |
| 5,000,635 A | * | 3/1991 | Jensen et al. ................. 410/77 |
| 5,131,606 A | | 7/1992 | Nordstrom |
| 5,316,242 A | | 5/1994 | Eilenstein-Wiegmann et al. |
| 5,564,654 A | | 10/1996 | Nordstrom |
| 6,425,717 B1 | | 7/2002 | Saggio et al. |
| 6,450,744 B1 | | 9/2002 | Gilhuys et al. |

FOREIGN PATENT DOCUMENTS

| DE | 19610374 | * | 9/1996 | .................. 410/77 |
|---|---|---|---|---|

* cited by examiner

*Primary Examiner*—D. Glenn Dayoan
*Assistant Examiner*—H. Gutman
(74) *Attorney, Agent, or Firm*—Harness, Dickey & Pierce P.L.C.

(57) ABSTRACT

A retractable restraint device is provided for restraining cargo pallets within a fuselage of an aircraft during flight. The device includes a lock mechanism having a base that is fixedly secured within a channel in a floor of the fuselage. Two parallel channels are typically used which each contain a plurality of the locking mechanisms spaced apart therealong. Each locking mechanism includes a guide having a lock hook and a lock catch member pivotally secured thereto. The lock hook is moveable from an unlocked position into a lock position relative to the pallet by releasing the lock catch member. A biasing spring urges the lock hook into engagement with the pallet. The lock hook is retained in its unlocked position by the lock catch member, which is also spring biased and which can be engaged with a foot to release the lock member into the locked position.

13 Claims, 6 Drawing Sheets

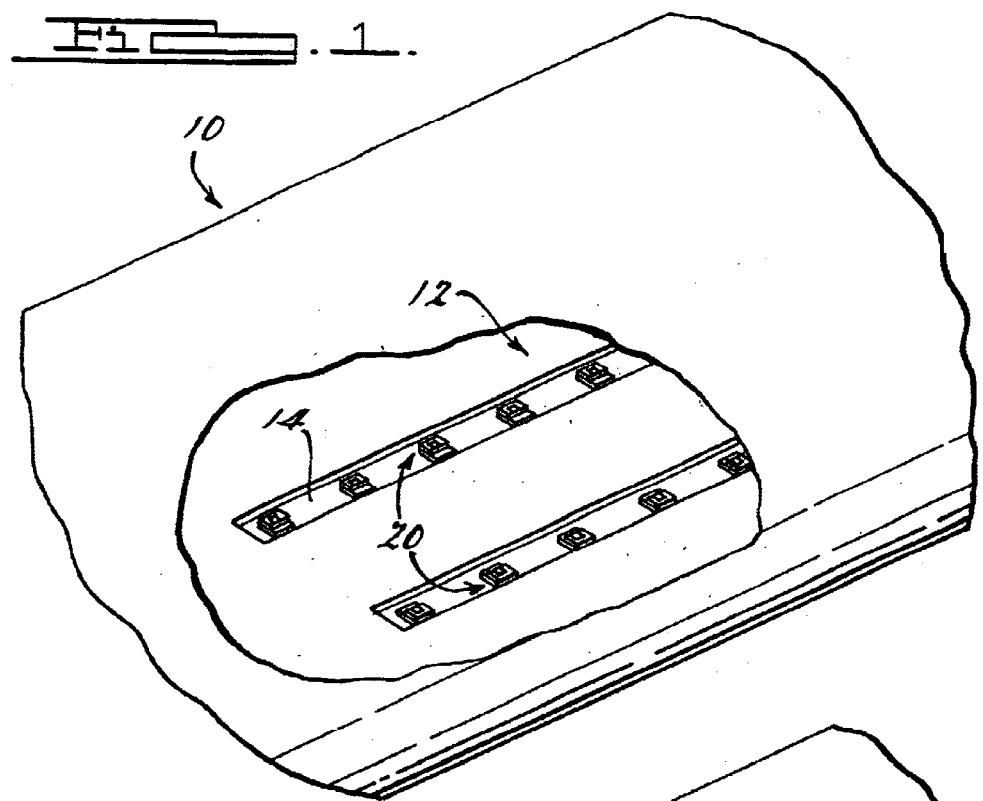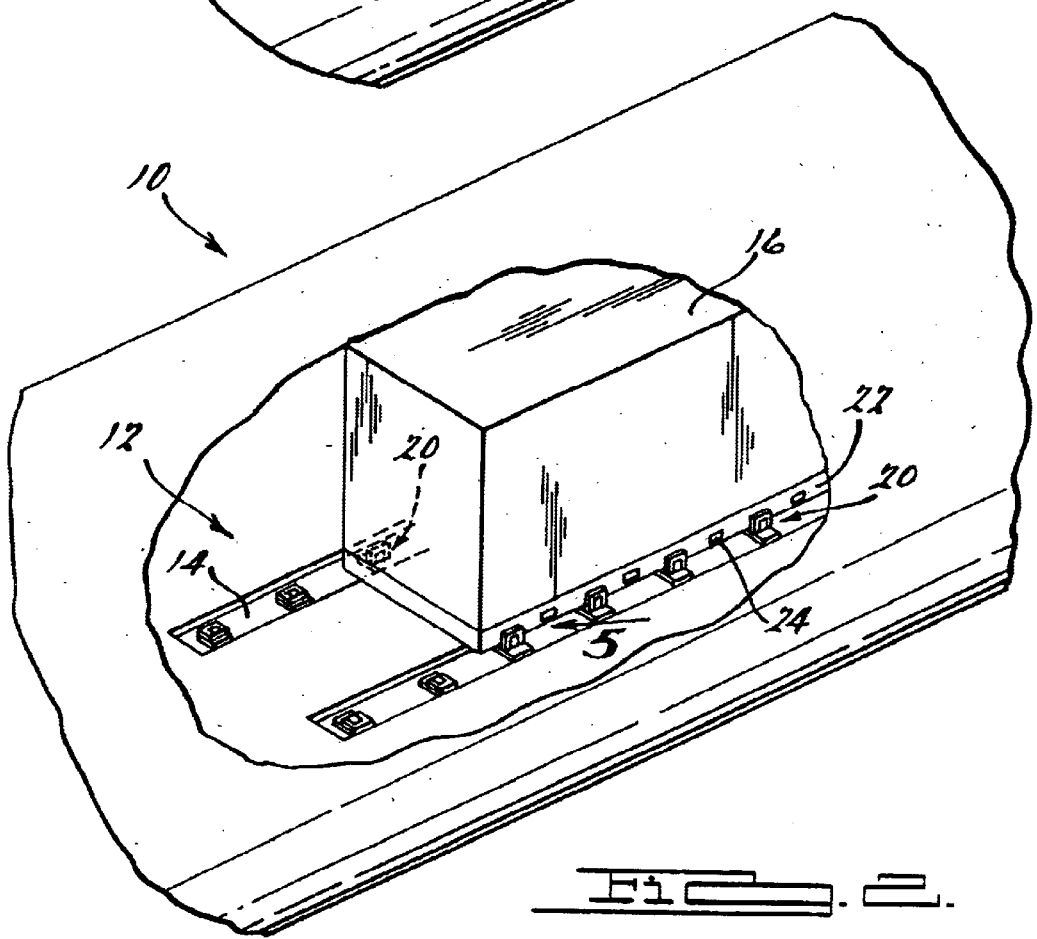

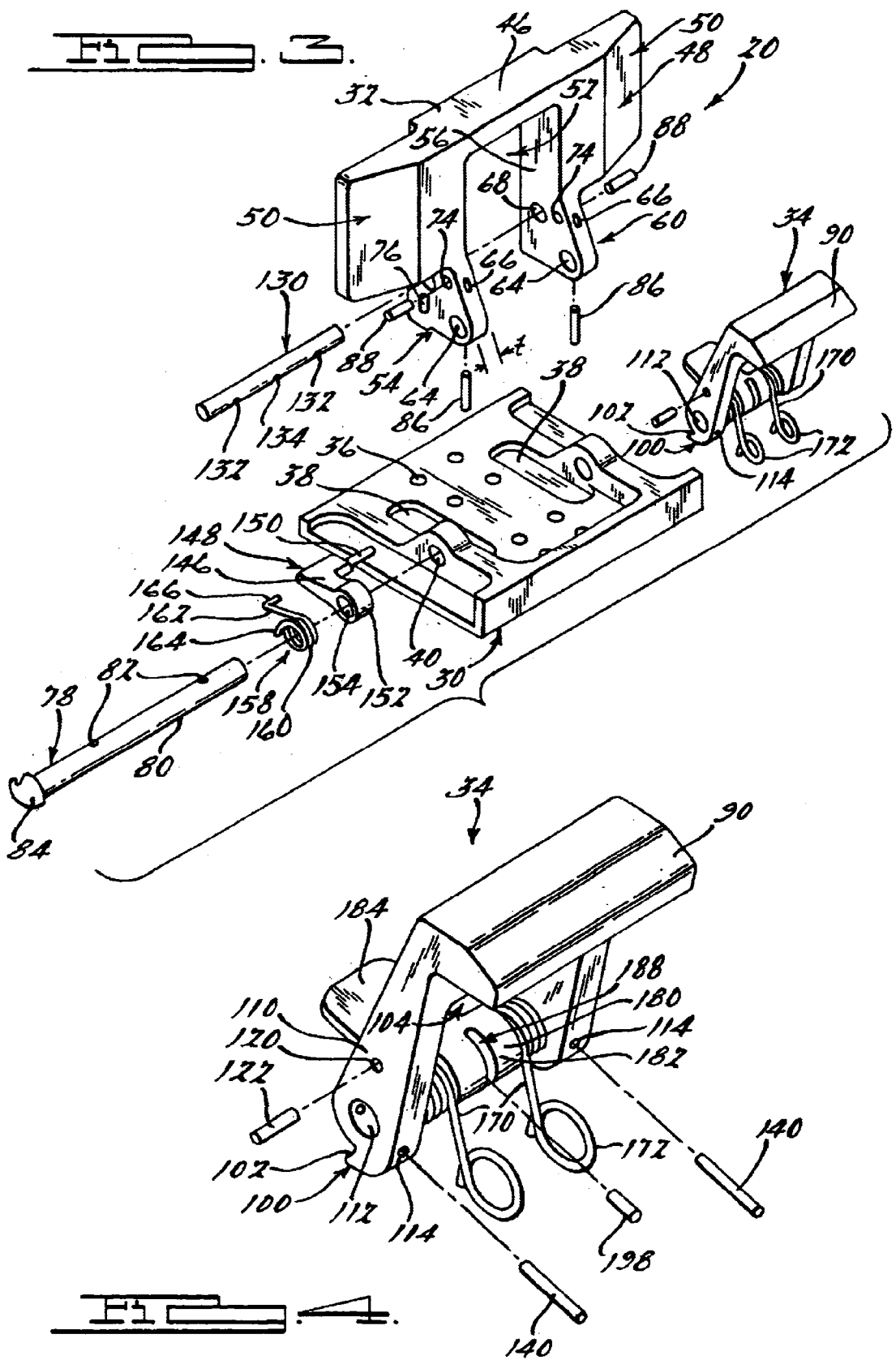

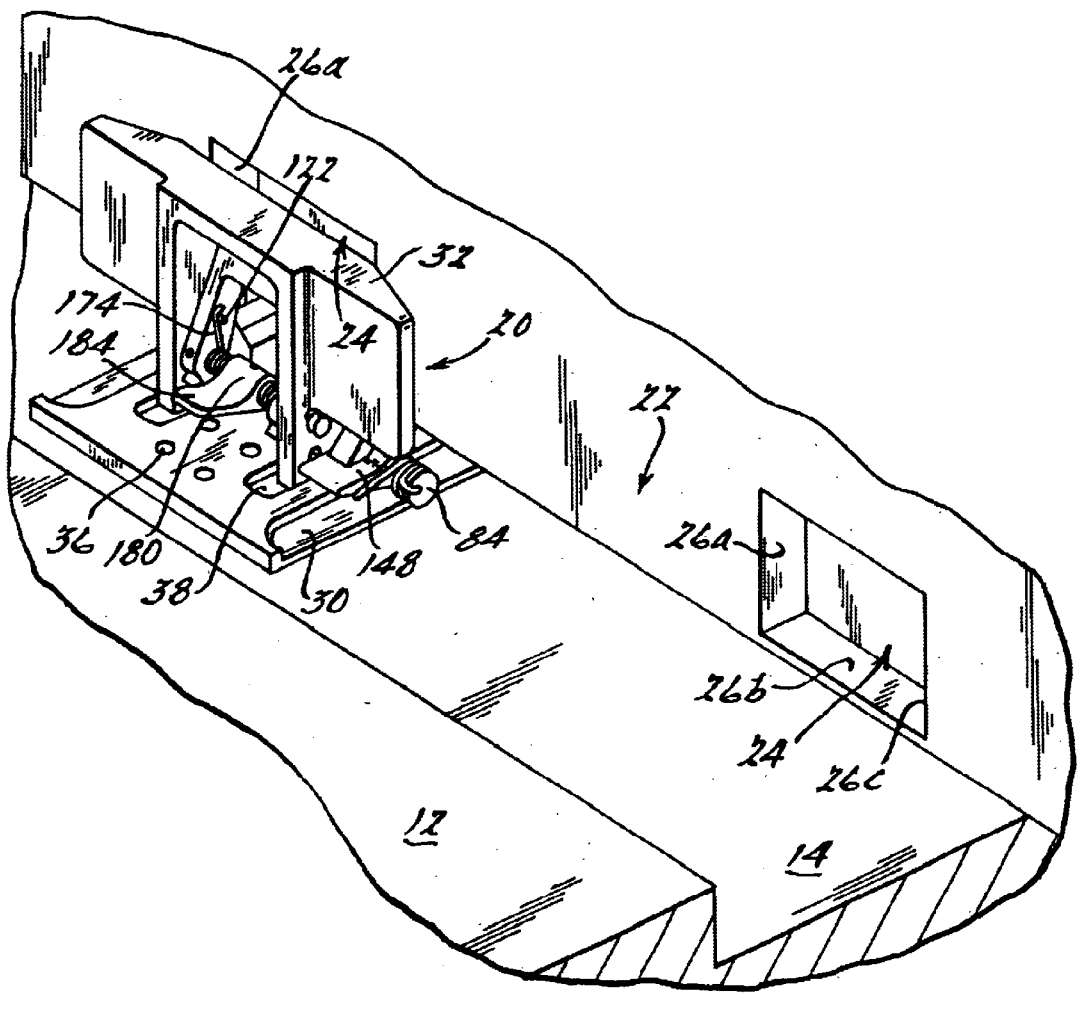

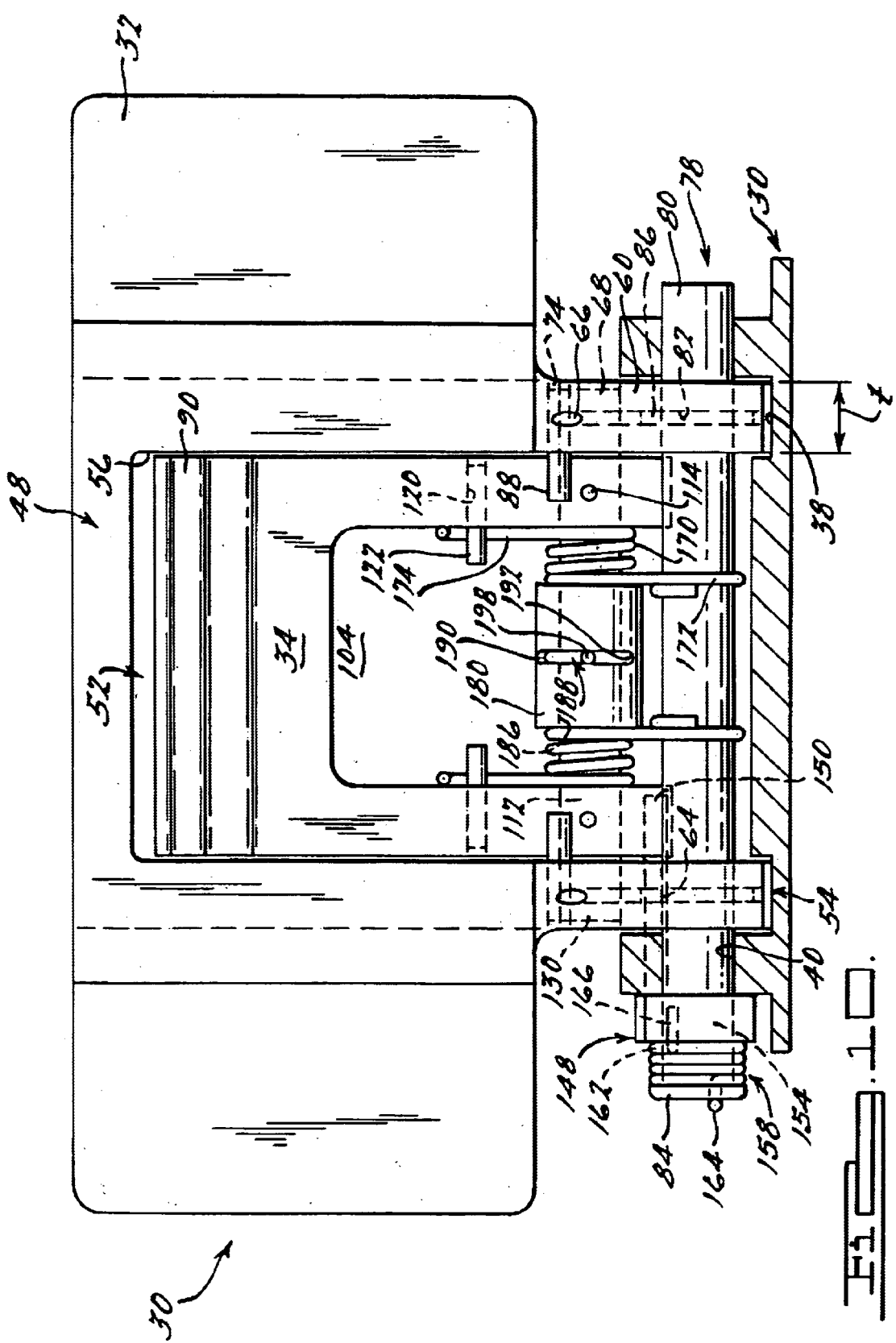

SUPPLEMENTAL CARGO RESTRAINT SYSTEM FOR OVERSIZED CARGO

FIELD OF THE INVENTION

The present invention relates generally to cargo restraint and location systems, and more specifically to multi-directional pallet restraints for cargo aircraft.

BACKGROUND OF THE INVENTION

Aircraft cargo restraint devices are required to secure cargo to the cargo deck of an aircraft during transport. Conventional cargo restraint devices typically secure a cargo container in either one or two orthogonal directions. Multiple restraints are required to secure the cargo. Adjacent cargo locations will often need to be left vacant to provide sufficient room for installing a number of cargo restraint devices to the cargo deck floor. As a result, hours can be expended by ground workers to restrain cargo containers for transport and to unload. This additional time results in non-revenue generating down time and extra manpower expenditures.

What is therefore needed is an easily actuated, compact cargo restraint system for restraining a cargo container in all three coordinate axes with a fewer number of restraint devices.

SUMMARY OF THE INVENTION

The present invention is directed to a retractable cargo restraint system. In one preferred form, the present invention provides a system to quickly locate and restrain oversize and/or overweight cargo loads to prevent movement during transportation. The system is also designed with the intent to be installed on a new or used aircraft without interfering with or negatively affecting the pre-existing, installed systems on the aircraft. The cargo restraint system utilizes pairs of locking mechanisms that are located on opposing sides of a cargo pallet. Each locking mechanism includes a base that is secured to the cargo deck and pivotally connected to a retractable guide. The guides are useful in aligning the cargo pallet on the cargo deck. The lock mechanism also includes a lock hook that is pivotally connected to the guide and engages the cargo pallet to secure the cargo pallet to the cargo deck.

In another preferred form, a cargo restraint system is provided that is retractable below the cargo deck, and that can be permanently installed in the aircraft so as to not interfere with other cargo handling functions when not in use. In another preferred form, the present invention incorporates a lateral guide with a lock mechanism for an aircraft cargo deck that is fully retractable below the plane of the cargo deck.

Further areas of applicability of the present invention will become apparent from the detailed description provided hereinafter. It should be understood that the detailed description and specific examples are intended for purposes of illustration only and are not intended to limited the scope of the invention.

BRIEF DESCRIPTION OF THE DRAWINGS

The present invention will become more fully understood from the detailed description and the accompanying drawings, wherein:

FIG. 1 is a partially broken away perspective view illustrating an aircraft having a cargo compartment with a restraint system constructed in accordance with the teachings of the present invention;

FIG. 2 is an enlarged view of a portion of FIG. 1, illustrating the restraint system in greater detail;

FIG. 3 is a partially exploded perspective view of a portion of the restraint system of FIG. 1, illustrating the lock mechanism in greater detail;

FIG. 4 is a partially exploded perspective view of the lock hook of the lock mechanism;

FIG. 5 is a perspective view of the lock mechanism engaged to a cargo pallet taken along the line 5 of FIG. 2;

FIG. 10 is a front view of the apparatus shown in FIG. 8.

DETAILED DESCRIPTION OF THE PREFERRED EMBODIMENTS

Figure 6:
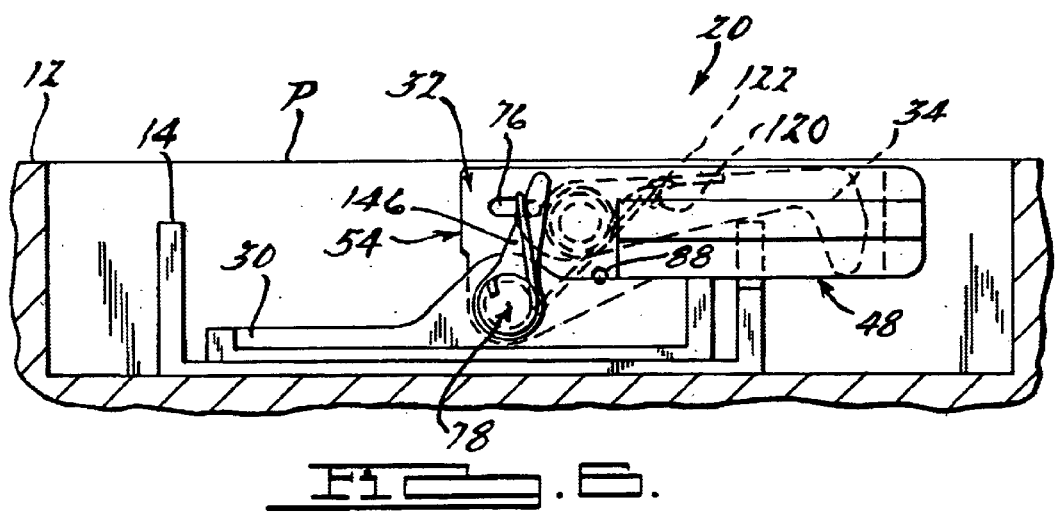
FIG. 6 is a side elevation view illustrating the lock mechanism with the guide in the lowered position.

The following description of the preferred embodiment(s) is merely exemplary in nature and is in no way intended to limit the invention, its application, or uses.

With reference to FIGS. 1 and 2 of the drawings, an exemplary aircraft is indicated generally by reference number 10. Aircraft 10 includes a fuselage having a cargo deck 12. The cargo deck 12 has a number of recessed channels 14 useful for restraining and locating a cargo container 16 (FIG. 2). Cargo container 16 is restrained to cargo deck 12 using a lock mechanism 20 in accordance with the teachings of the present invention. In use, typically a pair of lock mechanisms 20 are employed to secure a cargo container stationary within the fuselage. A plurality of lock mechanisms 20 are preferably arranged in two adjacent rows to better accommodate cargo containers of different sizes.

With specific reference to FIG. 2, cargo container 16 is secured to pallet 22 prior to being loaded onto aircraft 10. Pallet 22 is provided with engagement pockets 24. As best seen in FIG. 5, engagement pockets 24 have an interior surface defined in part by aft surface 26a, bottom surface 26b, and forward surface 26c. Pallet 22 is positioned between the two rows of lock mechanisms 20 and then secured for transport as discussed below.

Figure 7:
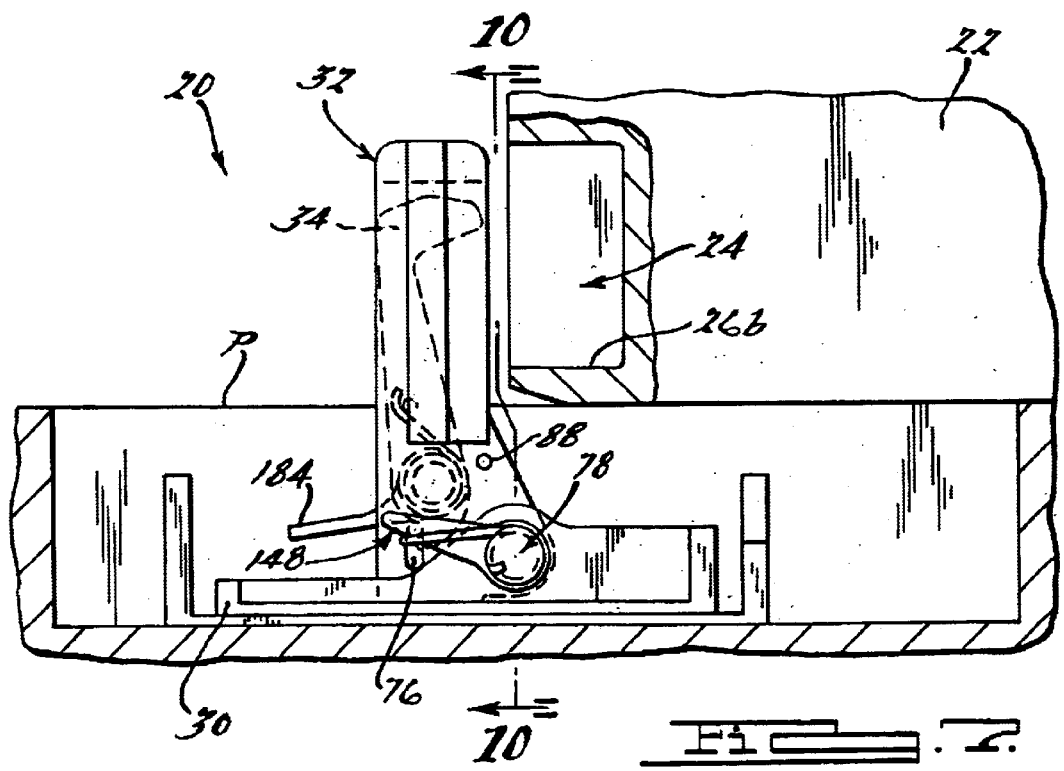
FIG. 7 is a side elevation view similar to FIG. 6 but illustrating the lock mechanism with the guide in the raised position adjacent a side of a pallet.

Referring now to FIGS. 3–10, the lock mechanism 20 is shown in greater detail. Lock mechanism 20 includes a base 30, a lateral guide 32, and a lock hook 34. Base 30 is preferably provided with mounting holes 36 for mounting within a respective one of the recessed channels 14 (FIG. 7). Base 30 includes recessed portions 38 and base guide apertures 40. Lateral guide 32 includes a body 46 with a guide surface 48 and beveled edges 50. Body 46 includes a lock hook opening 52 defining a passageway in the central portion of body 46 extending along guide surface 48 to a lower surface 54 and defining an interior surface 56. Lateral guide 32 further includes guide legs 60 integrally formed in body 46 and extending away from body 46 along interior surface 56. As best seen in FIG. 3, guide legs 60 are further defined by lower surface 54. Lateral guide 32 has guide shaft apertures 64, guide pin apertures 66, lock apertures 68, and stop pin apertures 74 formed through guide legs 60. At least one guide leg 60 has an uplock slot 76 formed therethrough. Uplock slot 76 extends parallel to guide shaft aperture 64 through the thickness "t" of guide leg 60. Uplock slot 76 is generally arc shaped with a radius of curvature about the axis of guide shaft aperture 64.

Each guide pin aperture 66 intersects a corresponding guide shaft aperture 64. Lateral guide 32 is pivotably coupled to base 30 by a guide shaft 78. To accomplish this connection, base 30 and lateral guide 32 are positioned such that base guide apertures 40 and guide shaft apertures 64 are aligned and then a guide shaft 78 is inserted therethrough. Guide shaft 78 includes a shaft portion 80 with retaining apertures 82 formed therethrough and a head 84 integrally formed at one end. When guide shaft 78 is fully inserted within base 30 and lateral guide 32, a guide shaft pin 86 is inserted into each guide pin aperture 66. Guide shaft 78 is positioned such that each retaining aperture 82 aligns with one guide pin aperture 66 and guide shaft pins 86 are further inserted until they reach a fully installed position. In this position, each guide shaft pin 86 extends through one retaining aperture 82 into a single guide pin aperture 66. In this manner, lateral guide 32 can be rotated relative to base 30, as discussed below. Each stop pin aperture 74 has a stop pin 88 interference fit therein and extends beyond interior surface 56 (FIG. 10).

Lateral guide 32 is shown in FIG. 6 in a retracted position wherein lateral guide 32 is folded below the plane P of cargo deck 12. Lateral guide 32 is shown in FIG. 7 in a raised positioned wherein lateral guide 32 extends above the plane P of cargo deck 12. In this position, lateral guide 32 can abut a side of pallet 22 along the guide surface 48 of lateral guide 32 as pallet 22 is positioned on cargo deck 12. Lateral guide 32 is shown in a preferred embodiment wherein the opposing ends of guide surface 48 each have a beveled edge 50 (FIGS. 3 and 5). Beveled edges 50 extend away from pallet 22. In this manner, some misalignment of pallet 22 will not result in interference between pallet 22 and lateral guides 32, and beveled edge 50 of lateral guide 32 can help to correct misalignment of pallet 22 as pallet 22 is located between the parallel rows of lock mechanisms 20 on cargo deck 12 (FIG. 2). Once pallet 22 is located between lock mechanisms 20, lateral guides 32 will interfere with the lateral sides of pallet 22 and thereby restrict lateral movement of pallet 22.

Figure 8:
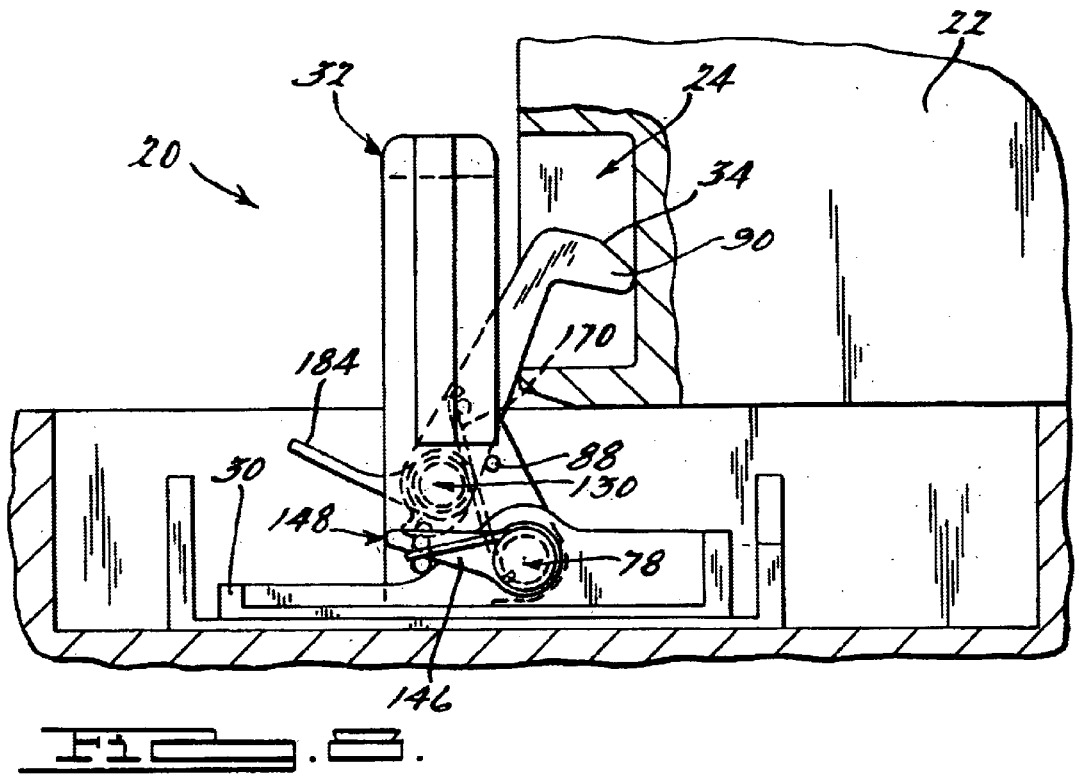
FIG. 8 is a side elevation view similar to FIG. 7 but illustrating the latch of the lock mechanism engaged to the pallet.
Figure 9:
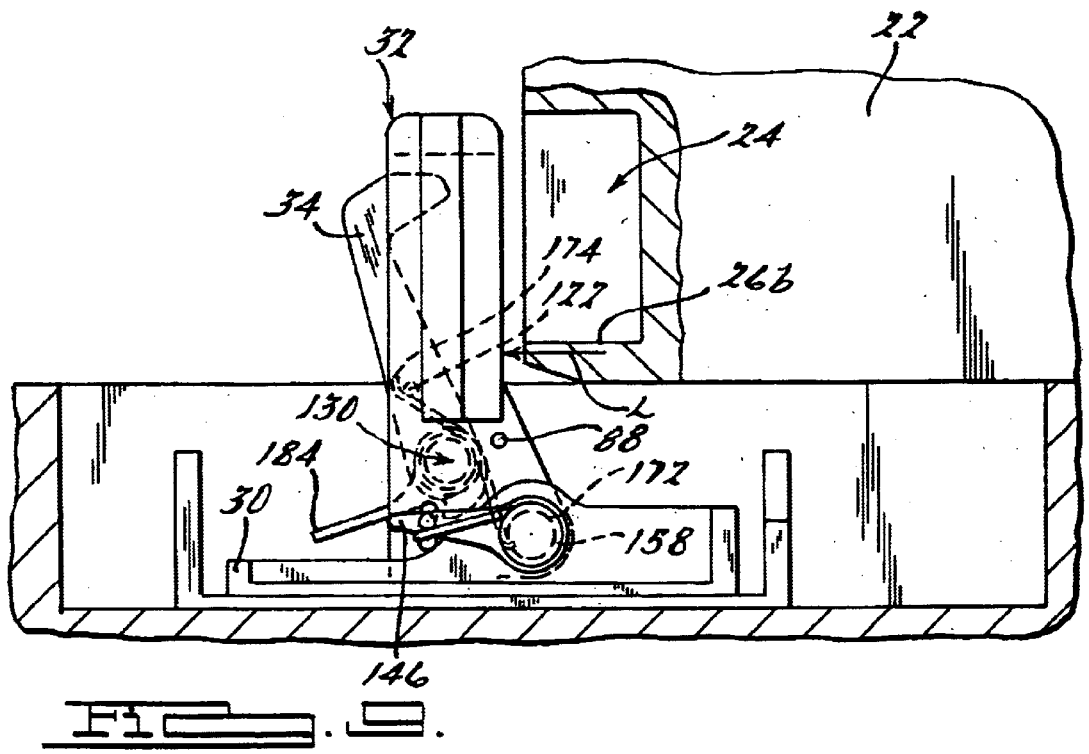
FIG. 9 is a side elevation view similar to FIG. 8, but illustrating the latch in a position rotated away from the pallet illustrating the alignment of the pawl and the chamfer which cooperate to maintain the latch in a stationary position relative to the guide.

When lateral guide 32 is in the raised position, each lower portion of guide leg 60 is located within the recessed portion 38 of base 30 with lower surface 54 of lateral guide 32 generally supported by the horizontal surface of recessed portion 38 (FIGS. 5 and 7–10). During pallet positioning and transport, pallet 22 can impart cargo loading force L on guide surface 48 (FIG. 9). To place lateral guide 32 into the retracted position, lateral guide 32 is rotated clockwise, as shown in FIG. 6, with guide surface 48 facing base 30. It would be readily recognized by one of ordinary skill in the art that this coupling arrangement of lateral guide 32 and base 30 provides a maximum of stability and resistance to force L as force L is translated to a moment about guide shaft 78 that is resisted by the resulting pressure between lower surface 54 and the horizontal surface of recessed portion 38.

In FIGS. 2–4 and 7, pallet 22 with cargo container 16 secured thereon is preferably located between pairs of lock mechanisms 20. Lateral guides 32 abut pallet 22. Lock hook 34 includes a hook 90 at a first end. The second end of lock hook 34 is defined by a cam surface 100, a chamfer 102 and a lock hook opening 104. Lock hook opening 104 is a cut out that extends from the central portion of lock hook 34 and opens onto the second end of lock hook 34 defining two lock hook legs 110. Lock hook legs 110 each have a generally circular lock hook mounting aperture 112 formed therethrough such that lock hook mounting apertures 112 are axially aligned.

Each lock hook leg 110 has a lock retaining pin aperture 114 formed therein such that each lock retaining pin aperture 114 perpendicularly intersects one lock hook mounting aperture 112. A lock deploy spring pin aperture 120 is formed through each lock hook leg 110 generally parallel to the lock hook mounting apertures 112. A lock deploy spring pin 122 is interference fit into each lock deploy spring pin aperture 120 such that each lock deploy spring pin 122 extends into lock hook opening 104 (FIG. 10). Lock hook 34 is pivotably connected to lateral guide 32 with a lock shaft 130. Lock shaft 130 extends through lock hook mounting apertures 112 and through axially aligned lock apertures 68 in the lateral guide 32. Lock shaft 130 is a cylindrical shaft that includes lock shaft pin apertures 132 and an unlock lever stop aperture 134 formed therein. The axes of lock shaft pin apertures 132 and unlock lever stop aperture 134 are preferably parallel to each other and perpendicular to the axis of lock shaft 130. When lock shaft 130 is properly inserted in lock hook mounting apertures 112 and lock apertures 68, lock retaining pin apertures 114 align with lock shaft pin apertures 132. A lock retaining pin 140 is then positioned within each lock retaining pin aperture 114 and corresponding lock shaft pin aperture 132 by interference fit. Preferably, the lock retaining pins 140 do not extend beyond the outer surfaces of lock hook 34 when positioned. Thus provided, lock hook 34 rotates between a locked position (FIG. 8) and an unlocked position (FIG. 7). In the embodiment shown, lock hook 34 rotates with lateral guide 32 as lateral guide 32 is raised from the retracted position to the raised position. Lock hook 34 is located below the plane of cargo deck 12 when lateral guide 32 is in the retracted position.

Referring now to FIGS. 3 and 4, the second end of lock hook 34 preferably includes a cam surface 100 and a chamfer 102. As best seen in FIG. 9, chamfer 102 interlocks with an uplock catch mechanism 146 to maintain lock hook 34 in the unlocked position and to prevent lock hook 34 from rotating to the locked position. Uplock catch mechanism 146 preferably includes a member of unitary construction that includes a first end 148 with a pawl 150 that extends therefrom, and a second end 152 with an uplock mounting aperture 154 formed therein. Preferably, pawl 150 is a cylindrical portion that extends from uplock catch mechanism 146 perpendicular to the alignment of the first end 148 and the second end 152. Uplock mounting aperture 154 is sized to freely rotate about guide shaft 78. As best seen in FIG. 3, uplock catch mechanism 146 also includes an uplock catch spring 158 that includes a helical portion 160, a first end 162 and a second end 164. Helical portion 160 is sized to accommodate guide shaft 78 therethrough. First end 162 extends tangentially away from helical portion 160 and includes an L-portion 166 that includes the extreme end portion formed generally perpendicular to the axis of first end 162. As seen in FIG. 10, L-portion 166 can abut the underside of uplock catch mechanism 146. Second end 164 of uplock catch spring 158 is formed into a hook that secures to head 84 of guide shaft 78.

As best seen in FIG. 10, guide shaft 78 is disposed through uplock mounting aperture 154 and uplock catch spring 158. Pawl 150 is disposed through uplock slot 76 such that the first end 148 of uplock catch mechanism 146 abuts a surface of lateral guide 32 that surrounds uplock slot 76. Pawl 150 extends through uplock slot 76, beyond interior surface 56 and into interference with either cam surface 100 or chamfer 102, depending upon the position of lock hook 34 relative to lateral guide 32. In this manner uplock catch spring 158 urges pawl 150 of uplock catch mechanism 146 toward chamfer 102.

As best seen in FIG. 8, pawl 150 of uplock catch mechanism 146 can be disengaged from chamfer 102 by using a finger or foot to rotate the first end 148 of uplock catch mechanism 146 away from chamfer 102 against the biasing force of uplock catch spring 158. When uplock catch mechanism 146 is disengaged, a lock deploy spring 170 urges lock hook 34 into the locked position. Lock deploy spring 170 is preferably a helical spring member with lock shaft 130 disposed therethrough.

As seen in FIG. 8, a first end 172 of lock spring 170 is preferably coiled about guide shaft 78 and a second end 174 of each lock deploy spring 170 is preferably positioned adjacent the portion of lock deploy spring pin 122 that extends into lock hook opening 104 (FIGS. 5 and 10). Thus provided, lock deploy springs 170 bias lock hook 34 toward the locked position to maintain the lock hook 34 in its locked position. Uplock catch spring 158 urges pawl 150 of uplock catch mechanism 146 toward cam surface 100 as lock hook 34 rotates relative to lateral guide 32. In the locked position, lock hook 34 extends beyond guide surface 48 and locks into engagement pocket 24. Stop pin 88 (FIGS. 8 and 10) prevents rotation of lock hook 34 beyond the locked position.

Turning now to the operation of lock mechanism 20, lock hook 34 extends above the lower portion of engagement pocket 24 when lock mechanism 20 is in the locked position (FIG. 8). Vertical movement of pallet 22 will be restricted by interference between lock hook 34 and bottom surface 26b of engagement pocket 24. As best seen in FIGS. 2 and 8, when lock mechanism 20 is in the locked position lock hook 34 extends into engagement pocket 24. Lock hook 34 interferes with the vertical interior surfaces 26a, 26c of engagement pocket 24 to restrict horizontal movement of pallet 22 in within the fuselage in a fore/aft direction. Thus provided, lock hook restricts the vertical, fore, and aft movement of pallet 22.

Lock mechanism 20 further includes an unlock lever 180. Unlock lever 180 includes an annular body 182 with an actuation pedal 184 extending therefrom. Annular body 182 includes a cylindrical bore 186 extending therethrough and an unlock lever stop guideway 188 extending from cylindrical bore 186 to an outer surface of annular body 182. Unlock lever stop guideway 188 is defined in part by a first end surface 190 and a second end surface 192. Annular body 182 of unlock lever 180 is interposed between lock hook legs 110 and lock shaft 130 is disposed through cylindrical bore 186. Unlock lever stop guideway 188 aligns with unlock lever stop aperture 134 and an unlock lever stop 198 is inserted through unlock lever stop guideway 188 and interference fit into unlock lever stop aperture 134. In this manner, unlock lever 180 can freely rotate about lock shaft 130 between a first position where unlock lever stop 198 contacts first end surface 190 and a second position where unlock lever stop 198 contacts a second end surface 192.

As best seen in FIGS. 9 and 10, a downward force on actuation pedal 184 of unlock lever 180 causes unlock lever stop 198 to contact second end surface 192 as unlock lever 180 rotates in a counter-clockwise direction. As more downward force is applied to actuation pedal 184, interference between unlock lever stop 198 and second end surface 192 of unlock lever stop guideway 188 causes counter-clockwise rotation of lock hook 34 from the locked position to the unlocked position. This in turn causes pawl 150 of uplock catch mechanism 146 to be urged downwardly in a counter-clockwise rotational movement by cam surface 100. This counterclockwise rotation of lock hook 34 is resisted by lock deploy springs 170. Further counter-rotation of unlock lever 180 forces cam surface 100 to travel beyond pawl 150 of uplock catch mechanism 146, whereupon the biasing force of uplock catch spring 158 forces the pawl 150 of uplock catch mechanism 146 into engagement with the chamfer 102. Lock hook 34 is then back in the unlocked position and uplock catch mechanism 146 prevents rotation of lock hook 34 to the locked position.

As best seen in FIGS. 5, 8 and 9, uplock catch mechanism 146 and unlock lever 180 are preferably located on lock mechanism 20 to allow foot actuation. In operation, uplock catch mechanism 146 can be depressed by foot to cause rotation of lock hook 34 to the locked position. Unlock lever 180 can likewise be depressed by foot, urging lock hook 34 to the unlocked position. Thus provided, lock mechanism can be actuated without the use of tools.

The present invention thus provides a compact retractable lock mechanism for securing an item to a floor or a cargo deck. The lock mechanism is well suited for aircraft cargo transportation where an easily actuated locking mechanism can reduce the time required to secure the cargo to an aircraft cargo deck and can also reduce the time required to remove the cargo. Importantly, the present invention serves the dual purpose of functioning not only to restrain cargo in the vertical and lateral axes, but also to restrain cargo in the longitudinal (fore and aft) axis. The present invention also provides a restraint system that utilizes a pair of locking mechanisms to guide cargo to the proper location and secure the cargo in all three coordinate axes.

It will be appreciated also that the present invention could just as easily be implemented in any form of mobile platform (e.g., van, bus, truck, railroad car, ship, etc.) that is used for carrying cargo that needs to be restrained during transportation.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A lock mechanism for releasably securing an article for transport within a mobile platform, the lock mechanism comprising:

a base that is adapted to be secured to a deck portion of the mobile platform;

a lateral guide coupled to the base so as to be capable of abutting said article and restraining movement of said article along a first axis;

a latch pivotably coupled to the base, the latch including an end for engaging the article, wherein the latch is adapted to engage the article so as to limit vertical and longitudinal movement of the article along second and third axes respectively; and a latch biasing spring for biasing the latch into a locked position.

2. The lock mechanism of claim 1, wherein the base is secured to a recessed portion of the deck portion, and the lateral guide is pivotably coupled to the base and moveable between a first position in which the guide is disposed below said deck portion and a second position wherein the guide extends above the deck portion.

3. The lock mechanism of claim 1, wherein the latch is pivotably coupled to the lateral guide.

4. The lock mechanism of claim 1, wherein one end of the latch further comprises a cam and a chamfer.

5. The lock mechanism of claim 4, further comprising:

an uplock catch mechanism pivotably coupled to the lateral guide, the uplock catch mechanism including a pawl and a pawl biasing spring, the pawl being moveable between a first position and a second position, the pawl biasing spring biasing the pawl into the first position where the pawl engages the chamfer in the latch to maintain the latch in a stationary condition relative to the lateral guide, wherein movement of the pawl toward the second position releases the pawl from the chamfer and permits the latch biasing spring to move the latch in a first rotational direction toward a locked position, and wherein rotation of the latch in a second rotational direction opposite the first direction effects movement of the pawl over the cam toward the second position to permit the pawl to engage the chamfer and thereby be held in the first position.

6. A restraint system for releaseably securing an article for transport on a pallet within a cargo area of a mobile platform, wherein the pallet has lateral sides, each of the lateral sides defining at least one engagement pocket, each said engagement pocket including a bottom surface, a forward surface and an aft surface, the system comprising:

a pair of lock mechanisms, each said lock mechanism including:
a base that is adapted to be secured to the mobile platform;
a lateral guide that is coupled to the base, the lateral guide including an inward lateral guide surface; and
a latch pivotably coupled to the lateral guide and moveable between a first condition in which the latch extends outwardly of a guide surface, and a second condition in which a gripping end of the latch is disposed within the engagement pocket of the associated lateral side of the pallet; the gripping end of the latch cooperating with the bottom surface, the forward surface, and the aft surface of the engagement pocket to limit movement of the pallet in a vertical direction, an aft direction and a forward direction, respectively.

7. The restraint system of claim 6, wherein the lateral guide is pivotably coupled to the base.

8. The restraint system of claim 6, wherein the lateral guide and latch are moveable between a first position and a second position, the lateral guide and latch disposed below a predetermined plane when positioned in the first position, and the lateral guide surface abutting an associated lateral side of the pallet when the lateral guide is positioned in the second position.

9. The restrain system of claim 6, further comprising a latch biasing spring for biasing the latch towards the second condition, wherein the lateral guides of the lock mechanisms cooperate to restrain the pallet in a lateral direction.

10. A guide mechanism for locating an article for transport within a cargo area of a mobile platform comprising:

a base that is adapted to be fixedly secured to the mobile platform;

a lateral guide coupled to the base for abutting a lateral side of said article and restraining movement of said article along a first axis;

a latch pivotably coupled to the base for rotation between a locked position and an unlocked position, the latch including a first end for engaging the article and a second end opposite the first end, the latch adapted to restrain the article in a vertical, forward and aft direction so as to limit vertical and longitudinal movement of the article along second and third axes respectively; and a release mechanism coupled to rotate with the latch, wherein the release mechanism can be actuated to cause rotation of the latch to the unlocked position.

11. The guide mechanism of claim 10, wherein the lateral guide is pivotably coupled to the base.

12. The guide mechanism of claim 10, wherein the base is in a location below a predetermined plane, and the lateral guide and latch are moveable between a first position in which the lateral guide and latch are disposed below the predetermined plane, to a second position wherein the lateral guide and latch extend above the predetermined plane.

13. The guide mechanism of claim 10, wherein the first end of the latch is further adapted to restrain the article in a vertical direction.

* * * * *